United States Patent
Cavalli et al.

(10) Patent No.: US 11,655,191 B2
(45) Date of Patent: May 23, 2023

(54) PRE-IMPREGNATED FIBRE-REINFORCED COMPOSITE MATERIAL AND FIBRE-REINFORCED COMPOSITE CERAMIC MATERIAL, OBTAINED BY FORMING AND SUBSEQUENT PYROLYSIS OF SAID PRE-IMPREGNATED MATERIAL

(71) Applicant: PETROCERAMICS S.P.A., Bergamo (IT)

(72) Inventors: Lorenzo Cavalli, Bergamo (IT); Massimiliano Valle, Bergamo (IT)

(73) Assignee: PETROCERAMICS S.P.A., Bergamo (IT)

( * ) Notice: Subject to any disclaimer, the term of this patent is extended or adjusted under 35 U.S.C. 154(b) by 221 days.

(21) Appl. No.: 16/636,068

(22) PCT Filed: Aug. 3, 2018

(86) PCT No.: PCT/IB2018/055842
§ 371 (c)(1),
(2) Date: Feb. 3, 2020

(87) PCT Pub. No.: WO2019/026035
PCT Pub. Date: Feb. 7, 2019

(65) Prior Publication Data
US 2020/0207668 A1    Jul. 2, 2020

(30) Foreign Application Priority Data
Aug. 3, 2017  (IT) .................. 102017000089373

(51) Int. Cl.
C04B 35/571  (2006.01)
C04B 35/628  (2006.01)
(Continued)

(52) U.S. Cl.
CPC ...... C04B 35/571 (2013.01); C04B 35/62844 (2013.01); C04B 35/645 (2013.01);
(Continued)

(58) Field of Classification Search
CPC ............ C04B 35/571; C04B 35/62844; C04B 35/645; C04B 2235/3895;
(Continued)

(56) References Cited

U.S. PATENT DOCUMENTS 5,552,466 A    9/1996  Beckley
5,725,828 A    3/1998  Zank
(Continued)

FOREIGN PATENT DOCUMENTS

CN    1598280 A    3/2005
CN    1793054 A    6/2006
(Continued)

OTHER PUBLICATIONS

"Technical Data Sheet SR 355S." Jul. 30, 2011 (Jul. 30, 2011), XP055460099. retrieved from teh internet: https://harwick.com/files/tds/GE_SILICONE_RESIN_SR_355-S.PDF [retrieved Oct. 23, 2021].*
(Continued)

Primary Examiner — Noah S Wiese
(74) Attorney, Agent, or Firm — Cantor Colburn LLP

(57) ABSTRACT

The invention relates to a pre-impregnated fibre-reinforced composite material in laminar form, obtained impregnating a fibrous mass with a polymeric binder composition and intended to be subjected to successive forming and pyrolysis operations to produce a fibre-reinforced composite ceramic material. The polymeric binder composition is based on one or more resins chosen from the group consisting of siloxane resins and silsesquioxane resins, and can optionally comprise one or more organic resins. The polymeric binder composition is a liquid with viscosity between 55000 and
(Continued)

10000 mPas at temperatures between 50° C. and 70° C. The polymeric binder composition forms a polymeric binding matrix, not cross-linked or only partially cross-linked that fills the interstices of the fibrous mass. The invention also relates to a method for making said pre-impregnated fibre-reinforced composite material in laminar form. The invention further relates to a fibre-reinforced composite ceramic material, obtained by forming and subsequent pyrolysis of a pre-impregnated fibre-reinforced composite material, as well as a method for making said material.

25 Claims, 1 Drawing Sheet

(51) Int. Cl.
    *C04B 35/645*     (2006.01)
    *C04B 35/80*     (2006.01)
    *B28B 3/00*     (2006.01)

(52) U.S. Cl.
    CPC .............. *C04B 35/80* (2013.01); *B28B 3/003* (2013.01); *C04B 2235/3895* (2013.01); *C04B 2235/483* (2013.01); *C04B 2235/5248* (2013.01); *C04B 2235/5252* (2013.01); *C04B 2235/656* (2013.01); *C04B 2235/6581* (2013.01)

(58) Field of Classification Search
    CPC ........ C04B 2235/483; C04B 2235/656; C04B 2235/6581; B28B 3/003
    See application file for complete search history.

(56) References Cited

U.S. PATENT DOCUMENTS

| | | | |
|---|---|---|---|
| 6,743,393 B1 | 6/2004 | Petrak | |
| 8,309,213 B2 * | 11/2012 | Clarke | C08K 3/38 |
| | | | 428/292.1 |
| 2010/0304152 A1 | 12/2010 | Clarke | |
| 2012/0034428 A1 | 2/2012 | Clarke | |
| 2015/0099078 A1 | 4/2015 | Fish | |
| 2020/0207668 A1 | 7/2020 | Cavalli | |
| 2020/0247971 A1 | 8/2020 | Cavalli et al. | |

FOREIGN PATENT DOCUMENTS

| | | | | |
|---|---|---|---|---|
| CN | 101717255 A | | 6/2010 | |
| CN | 102584307 A | * | 7/2012 | ............ C04B 41/85 |
| CN | 103951455 A | | 7/2014 | |
| CN | 104926341 A | | 9/2015 | |
| DE | 4016052 A1 | * | 11/1991 | ........... C04B 35/571 |
| DE | 4016052 A1 | | 11/1991 | |
| EP | 0423689 A2 | | 4/1991 | |
| EP | 0549224 A1 | | 12/1992 | |
| EP | 0549224 A1 | | 6/1993 | |
| EP | 0963250 A2 | | 8/1999 | |
| GB | 2150581 A | * | 7/1985 | ............... C09D 5/06 |
| GB | 2150581 A | | 7/1985 | |

OTHER PUBLICATIONS

Bongio et al. Polymer derived ceramic matrix composites for friction applications. Advances in Applied Ceramics: Structural, Functional & Bioceramics. Nov. 2009, vol. 108 Issue 8, p. 483-487.*
Anonymous:, "1166-BGF Industries, Inc" Jan. 1, 2018, hhtps://www.bgf.com/datasheet/1166, XP055460152.
International Search Report for corresponding application PCT/IB2018/055842 filed Aug. 3, 2018; dated Oct. 30, 2018.
International Search Report for corresponding application PCT/IB2018/055844 filed Aug. 3, 2018; dated Nov. 2, 2018.
Jens Schroter, "Handbuch Medienwissenschaft", Apr. 11, 2014, URL: www.dcproductucts.com.au, XP055460111.
Sr 355s: "Technical Data Sheet SR 55S", Jul. 30, 2011, URL: https://www.momentive.com, XP055460099.
Written Opinion for corresponding application PCT/IB2018/055842 filed Aug. 3, 2018; dated Oct. 30, 2018.
Written Opinion for corresponding application PCT/IB2018/055844 filed Aug. 3, 2018; dated Nov. 2, 2018.
Final Office Action dated May 10, 2022; U.S. Appl. No. 16/636,076, filed Feb. 3, 2020 (10 pages).
Non-Final Office Action dated Aug. 5, 2021; U.S. Appl. No. 16/636,076, filed Feb. 3, 2020 (27 pages).
Notice of Allowance dated Aug. 8, 2022; U.S. Appl. No. 16/636,076, filed Feb. 3, 2020 (12 pages).

* cited by examiner

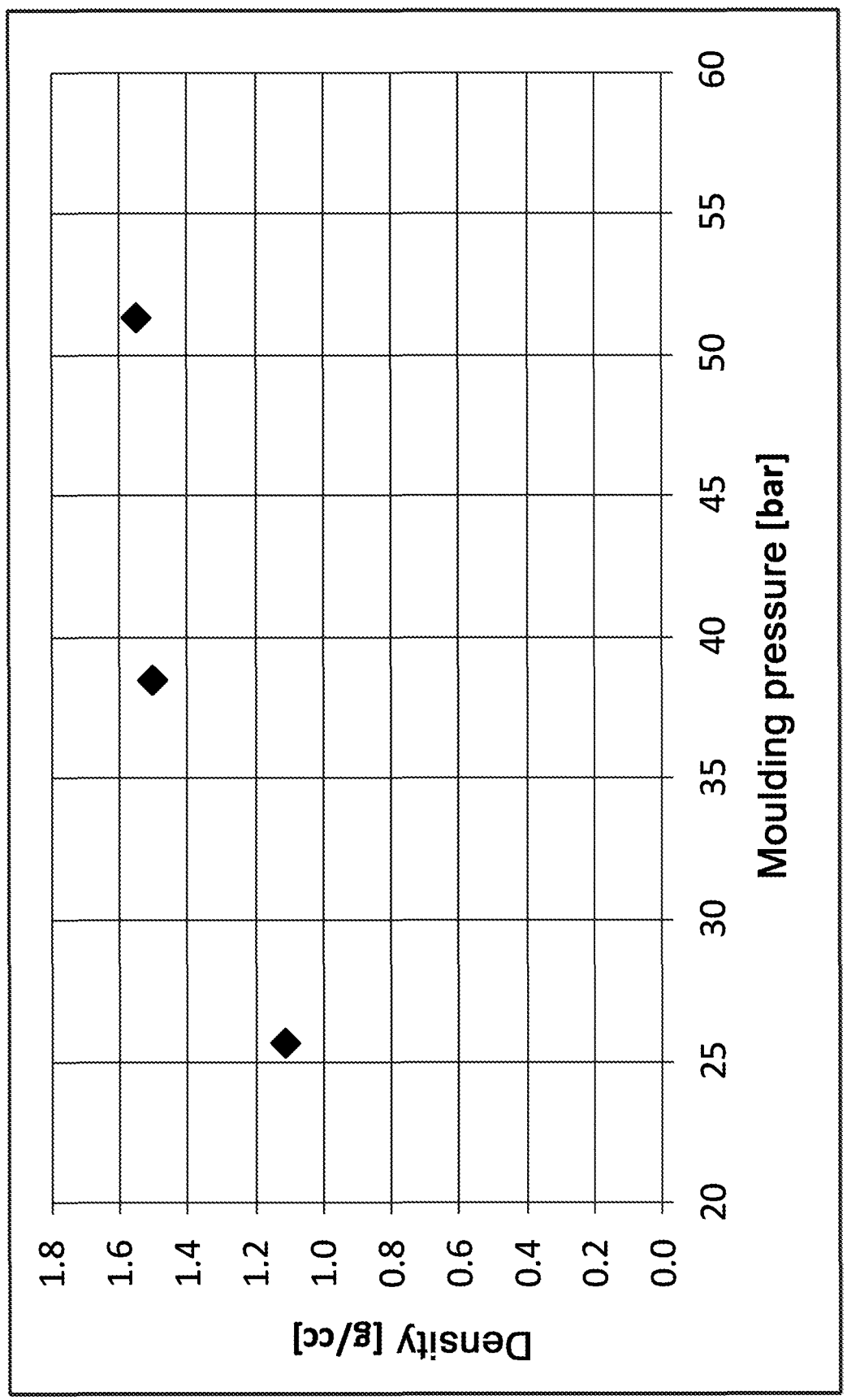

PRE-IMPREGNATED FIBRE-REINFORCED COMPOSITE MATERIAL AND FIBRE-REINFORCED COMPOSITE CERAMIC MATERIAL, OBTAINED BY FORMING AND SUBSEQUENT PYROLYSIS OF SAID PRE-IMPREGNATED MATERIAL

FIELD OF THE INVENTION

The present invention relates to a pre-impregnated fibre-reinforced composite material and a fibre-reinforced composite ceramic material, obtained by forming and subsequent pyrolysis of said pre-impregnated (pre-preg) material.

The pre-impregnated fibre-reinforced composite material according to the present invention (hereafter also, more briefly, called "pre-preg") is intended to be subjected to successive forming and pyrolysis operations to obtain a fibre-reinforced composite ceramic material, finding application as a basic material for the production—through successive treatments and work processes (forming, pyrolysis and possibly densification)—of components intended to operate at medium temperatures, even higher than 400° C., for example heat-resistant bulkheads or other components intended to operate at high temperatures.

State of the Art

As is known, in the technical jargon a fibre-reinforced composite material pre-impregnated with a polymeric binder composition is simply called "pre-preg".

A pre-preg consists of fibres, generally carbon fibres and/or glass fibres and/or ceramic fibres, arranged to form a fabric or a nonwoven fabric, and impregnated with a thermosetting or thermoplastic polymeric composition. During any forming process, the polymeric composition, impregnating the fibres, forms a binding matrix that fixes the fibres to each other.

Thermoplastic matrices are processed by heating to higher temperatures than the typical glass transition temperature of the material. This allows polymeric chains to move and slide on each other, until the temperature is again brought below the glass transition temperature (Tg), in a reversible process.

In the case of thermosetting matrices, the work processes are carried out before an amount of chemical bonds is created between adjacent chains (cross-linking or curing) such as to prevent their relative motion, bringing the polymer to be cured in a non-reversible process.

In pre-preg production, the thermosetting polymeric compositions used are based on organic resins, generally epoxydic or phenolic, or resins based on vinyl ester or cyanate ester. For these purposes, within these resin families, resins are used with such rheological characteristics (in particular viscosity) as to allow the obtainment of the desired degree of integration/impregnation between fibres and resin during the impregnation phase.

In the production of pre-preg, the thermoplastic polymeric binder compositions used are, for example, polyetheretherketone (PEEK), polyetherimide (PEI) and poly paraphenylene sulphide (PPS).

During the production of the pre-preg the thermosetting polymeric matrix is not crosslinked or is only partially crosslinked, so as to make the pre-preg manipulable, but still workable. For this purpose, the pre-preg is preserved at low temperature to avoid the completion of cross-linking.

Operatively, the process for producing a pre-preg comprises an impregnating step in which the fibres are placed on flat surfaces and in this configuration they are impregnated with the polymeric composition. During this step, the partial cross-linking of the thermosetting polymeric composition can take place at variable temperatures in the prior art according to the polymeric composition used. The material is then cooled to ambient temperature. The pre-preg is then available in the form of flat workable foils, which may then be worked to obtain components with far more complex shapes, for example by layering or rolling and subsequent shaping operations.

The organic resins provide the pre-preg with good mechanical resistance characteristics already after partial cross-linking.

However, pre-pregs made with organic resins have a series of limits that affect the characteristics of the materials obtained from them, or that make them unusable in fact for determined applications.

For example, organic resins form, as a result of pyrolysis, a carbonaceous residue, which in the case of epoxy resins is also very limited and insufficient to assure a good consistency of the composites. Said carbonaceous residue, moreover, is not suitable for applications with high temperatures in oxidising environment and does not have sufficient hardness to assure good abrasion resistance.

For example, the low yield of epoxy resins as a result of pyrolysis makes pre-pregs based on epoxy resins inadequate for the manufacture of preforms for densification processes.

A traditional pre-preg based on organic resins can present, for example, the following limits:
low operating temperature of the composites obtained after complete cross-linking of the resins; while these composites have excellent mechanical resistance characteristics, it is difficult for them to work above 200° C. in oxidising atmosphere;
low resistance to wear by mechanical abrasion, due to the presence of carbonaceous matrices in the compounds obtained;
impossibility to generate amorphous and/or crystalline inorganic structures as a result of pyrolysis;
low thermal conductivity of the composite, which makes is unsuitable for applications that require high heat dissipation capability There is the need to obtain pre-pregs that can lead, as a result of pyrolysis of temperatures between 400° C. and 1500° C., to the formation of amorphous and/or crystalline inorganic structures, such as to make the composite materials thus obtained:
characterised by high thermal conductivity;
adequate to the manufacture of preforms for densification processes;
characterised by higher hardness so as to assure superior abrasion resistance.

To date, this need has not been met because alternative resins, potentially able to satisfy the aforesaid technical requirements, for example silicone-organic preceramic resins (siloxane resins, silazane resins, etc.), nevertheless have such rheological characteristics as to make them unsuitable for the impregnation of fibrous masses with common pre-preg fabrication technologies.

DESCRIPTION OF THE INVENTION

Therefore, an object of the present invention is to eliminate, or at least to reduce, the aforementioned problems, relating to the prior art, making available a pre-impregnated fibre-reinforced composite material (pre-preg) with a polymeric binder composition that does not contain, or at least does not exclusively contain organic resins, such as epoxydic or phenolic resins or resins based on vinyl ester or cyanate ester.

In particular, an object of the present invention is to make available a pre-impregnated fibre-reinforced composite material (pre-preg) with a polymeric binder composition that does not contain, or at least does not exclusively contain organic resins, such as epoxy resins or phenolic resins, and that can lead, as a result of pyrolysis at temperatures between 400° C. and 1500° C., to the formation of amorphous and/or crystalline inorganic structures, such as to make the composite materials thus obtained adequate for the production of preforms for high temperature processes.

In particular, an object of the present invention is to make available a pre-impregnated fibre-reinforced composite material (pre-preg) with a polymeric binder composition that does not contain, or at least does not exclusively contain organic resins, such as epoxy resins or phenolic resins based on vinyl ester or cyanate ester, and that can lead, as a result of pyrolysis at temperatures between 400° C. and 1500° C., to the formation of amorphous and/or crystalline inorganic structures, such as to make the composite materials thus obtained adequate for manufacturing preforms for densification processes and characterised by higher hardness so as to assure superior abrasion resistance and high thermal conductivity.

DESCRIPTION OF THE DRAWINGS

The technical features of the invention can be clearly understood from the content of the claims that follow and its advantages shall be more readily apparent in the detailed description that follows, made with reference to the accompanying drawings, which represent one or more purely exemplifying and non-limiting embodiments, in which:

FIG. 1 shows the graph of density versus moulding pressure of a fibre-reinforced composite material obtained by hot forming (through compression moulding) of a pre-preg and from which a fibre-reinforced composite ceramic material is obtained by pyrolysis.

DETAILED DESCRIPTION

The present invention refers to a pre-impregnated fibre-reinforced composite material in laminar form, obtained impregnating a fibrous mass with a polymeric binder composition, known in the jargon as pre-preg.

Said pre-impregnated fibre-reinforced composite material is intended to be subjected to successive subsequent forming and pyrolysis operations to obtain a fibre-reinforced composite ceramic material.

According to the invention, unlike traditional pre-pregs impregnated exclusively with organic resins (phenolic or epoxydic resins or resins based on vinyl ester or cyanate ester), the polymeric binder composition is based on one or more resins selected in the group consisting of siloxane resins and silsesquioxane resins.

The expression "based on . . . " means that the resins selected in the group consisting of siloxane resins and silsesquioxane resins constitute at least 70% by weight of the polymeric binder composition.

Optionally, the aforesaid polymeric binder composition can comprise organic resins, preferably epoxy resins, phenolic resins and/or resins based on vinyl ester or cyanate ester. However, organic resins, if present, do not constitute more than 30% by weight of the polymeric binder composition.

Preferably, the aforesaid polymeric binder composition comprises only resins chosen in the group consisting of siloxane resins and silsesquioxane resins, and does not comprise organic resins.

Silsesquioxane resins are polymeric resins comprising polysiloxanes or are polysiloxane-based, while silsesquioxane resins are polymeric resins comprising polysilsesquioxanes or are polysilsesquioxane-based.

Polysiloxanes and polysilsesquioxanes are compounds characterised by the presence of silicon—oxygen bonds in the main chain.

polysiloxanes have the following basic structure

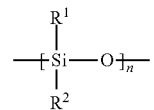

while polysilsesquioxanes have the following basic structure
According to

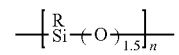

another aspect of the present invention, the aforesaid polymeric binder composition is a liquid with viscosity between 55000 and 10000 mPas at temperatures between 50° C. and 70° C.

In particular, viscosity is understood to be measured with a Brookfield viscometer, with a shear rate of 1 $s^{-1}$, unless otherwise indicated in the text.

In particular, the aforesaid polymeric binder composition is a pseudo-plastic liquid up to temperatures of approximately 60° C. tending to a Newtonian behaviour beyond this temperature, with viscosity between approximately 55000 mPas at 50° C. and 1 $s^{-1}$ and approximately 10000 mPas at 70° C. regardless of shear rate.

In particular, the polymeric composition also has a pseudo-plastic behaviour (with viscosity decreasing as the shear rate increases) that increases as temperature decreases. This feature allows the polymeric composition to behave like an elastic, flexible solid at ambient temperature, thus preventing it from dripping and being separated from the fibres. At growing temperatures, on the contrary, the polymeric composition tends to behave progressively more like a fluid, until becoming nearly Newtonian. Viscosity at 50° C. is equal to approximately 55000 mPas applying a shear rate of 1 $s^{-1}$ and 25000 mPas applying a shear rate of 3 $s^{-1}$. At 60° C., viscosity is approximately 18000 mPas at 3 $s^{-1}$ and measures 16000 mPas at 8.5 $s^{-1}$, hence tending to the typical behaviour of a Newtonian fluid.

These rheological characteristics make the polymeric binder composition particularly suited to the impregnation of fibrous masses in the process of manufacturing a pre-impregnated fibre-reinforced composite material in laminar form, overcoming the limits that hitherto have prevented its use.

In the pre-impregnated fibre-reinforced composite material in laminar form according to the invention, the polymeric binder composition forms a binding matrix, not cross-linked or only partially cross-linked, which fills the interstices of the fibrous mass. In this way, the fibre-reinforced composite material in laminar form is on one hand manipulable, and on the other hand still flexible. The solidification of the polymeric binder composition in the pre-preg would entail its stiffening with consequent loss of the workability characteristics.

Advantageously, the pre-impregnated fibre-reinforced composite material in laminar form according to the invention can be obtained according to a traditional production process for the manufacture of a pre-preg:

arranging the fibrous mass in laminar form;

impregnating step, in particular at temperatures between 60 and 100° C., during which the fibrous mass is impregnated with the polymeric binder composition and the polymeric binder composition may be partially cross-linked; and cooling to ambient temperature the composite material thus obtained.

In particular, application of the polymeric binder composition on the fibrous mass can be obtained depositing the polymeric composition beforehand on a transfer support (for example, made of paper). The presence of the transfer support facilitates the deposition of the polymeric binder composition on the fibrous mass. The deposition of the polymeric composition on the transfer support is achieved in a so-called step of filming the polymeric binder composition.

Alternatively, the polymeric binder composition can be applied directly on the fibrous mass.

In particular, the pre-impregnated fibre-reinforced composite material according to the invention can be obtained in the form of flat workable foils, which may then be subsequently processed to obtained components with much more complex shapes, for example by stratification or rolling and subsequent shaping operations. These components are subsequently subjected to additional treatments (complete cross-linking, pyrolysis, densification) to obtain final products with specific characteristics.

Siloxane and silsesquioxane resins have different characteristics from the organic (mainly epoxydic) resins normally used for manufacturing pre-pregs based on carbon fibres or glass fibres or ceramic fibres.

A peculiar characteristic of siloxane resins and silsesquioxane resins is the ability to form, as a result of pyrolysis at temperatures between 400 and 900° C., amorphous structures consisting of Si—O—C chains. These structures can be crystallised by heat treatments at higher temperatures, around 1300-1500° C. In this way it is possible to form, starting from resins selected from the group consisting of siloxane resins and silsesquioxane resins, silicon Carbide, a compound with properties of technological interest, such as: very high hardness, high elastic modulus, high melting point and thermal stability, high thermal conductivity.

Instead, organic resins form, as a result of pyrolysis, a carbonaceous residue, which in the case of epoxy resins is also very limited and insufficient to assure a good consistency of the composites. Said carbonaceous residue, moreover, is not suitable for applications with high temperatures in oxidising environment and does not have sufficient hardness to assure good abrasion resistance. For this reason, according to the invention, the polymeric binder composition preferably does not contain organic resins. In any case, the content of organic resins is no higher than 30% by weight of the polymeric binder composition, so as to limit the negative effect given by the presence of the organic resins.

Organic resins are theoretically more suited for manufacturing pre-pregs to be used "as cured" and at low temperatures, because they provide the composite with superior mechanical characteristics.

The pre-impregnated fibre-reinforced composite material with polymeric binder composition based on siloxane resins and/or silsesquioxane resins pyrolyzed and optionally densified according to the invention is particularly indicated for applications at high temperatures, in conditions at which the compounds with exclusively organic base could not operate.

The materials obtained starting from a pre-impregnated fibre-reinforced composite material (pre-preg) according to the invention can be used for obtaining preforms to be pyrolyzed and densified.

Siloxane or silsesquioxane resins, given the reduced weight loss after pyrolysis and the possibility of forming silicon Carbide, are indicated to make preforms to be densified. The term "densification" means processes such as: polymer impregnation and pyrolysis (PIP) or liquid silicon infiltration (LSI).

As will be described in more detail below, the characteristics of a composite obtained from a pre-preg according to the invention after pyrolysis and optionally densification are:

medium mechanical characteristics (ultimate tensile stress up to approximately 300-350 MPa, a value that is influenced by many factors, including fibres and types and levels of densification);

Low thermal conductivity (>1 W/(m·° K));

Good resistance to abrasion wear;

Operating temperature up to 1000° C., in any case variable according to the densification processes.

Applications for which composites obtained in this way can be of interest are, for example, heat resistant bulkheads or other components intended to operate at high temperatures.

The above advantages are evident if the preform is subjected to densification process with PIP techniques. The use of resins containing silicon is the only way to generate silicon Carbide in matrix directly in the preform. This could in no way be obtained if the preform were produced from pre-preg based on organic resins. This aspect allows to realise, with PIP techniques, composites with a significantly higher content of silicon Carbide in matrix than the composites obtained applying the same techniques to carbonaceous preforms obtained exclusively from organic resins.

These advantages instead are less evident in the case of densification with LSI technique. It should be recalled that the infiltration with silicon allows to form a high quantity of silicon Carbide in matrix also starting from a pre-preg with organic base (for example a phenolic pre-preg).

According to a preferred embodiment of the invention, the aforesaid polymeric binder composition constitutes from 25% to 60% by weight of said pre-impregnated fibre-reinforced composite material, while the fibrous mass constitutes from 40% to 75% by weight of said pre-impregnated fibre-reinforced composite material.

The content of fibres and of polymeric binder composition can be varied according to the characteristics to be obtained in the final materials to be produced starting from the pre-preg according to the invention.

A pre-preg with high fibre content is more indicated for applications for which high mechanical characteristics are required. A higher percentage of polymeric binder composition can instead be more indicated for applications requiring higher operating temperatures, flameproof protection or resistance to mechanical wear.

According to a preferred embodiment of the invention, the aforesaid polymeric binder composition comprises a mixture of:

at least one resin selected from the group consisting of siloxane and silsesquioxane resins, solid at room temperature, with melting point range of between 40° C. and 90° C.; and at least one resin selected from the group consisting of siloxane resins and silsesquioxane resins, liquid at room temperature, with viscosity at ambient temperature of between 1 mPas and 5000 mPas.

In general, the weight ratio between solid resin at ambient temperature and liquid resin at ambient temperature is selected so that the polymeric binder composition obtained is a liquid with viscosity between 55000 and 10000 mPas at temperatures between 50° C. and 70° C.

In particular, the aforesaid polymeric binder composition is a pseudo-plastic liquid up to temperatures of approximately 60° C. tending to a Newtonian behaviour beyond this temperature, with viscosity between approximately 55000 mPas at 50° C. and 1 s$^{-1}$ and approximately 10000 mPas at 70° C. regardless of shear rate.

In particular, the polymeric composition also has a pseudo-plastic behaviour (with viscosity decreasing as the shear rate increases) that increases as temperature decreases. This feature allows the polymeric composition to behave like an elastic, flexible solid at ambient temperature, thus preventing it from dripping and being separated from the fibres. At growing temperatures, on the contrary, the polymeric composition tends to behave progressively more like a fluid, until becoming nearly Newtonian. Viscosity at 50° C. is equal to approximately 55000 mPas applying a shear rate of 1 s$^{-1}$ and 25000 mPas applying a shear rate of 3 s$^{-1}$. At 60° C., viscosity is approximately 18000 mPas at 3 s$^{-1}$ and measures 16000 mPas at 8.5 s$^{-1}$, hence tending to the typical behaviour of a Newtonian fluid.

Preferably, the weight ratio between solid resin at room temperature and liquid resin at room temperature is between 100/30 and 100/50.

Advantageously, the aforesaid polymeric binder composition can consist entirely of the aforesaid mixture of solid resin and liquid resin at ambient temperature.

Preferably, the solid resin at ambient temperature is selected from the group consisting of: a phenyl siloxane resin (for example, commercial products Silres 601 or RSN-0217), methyl siloxane resin, methyl phenyl silsequioxane resin (for example, the commercial product Silres H44), methyl silsesquioxane resin (for example, commercial product Silres MK).

Preferably, the liquid resin at ambient temperature is selected from the group consisting of: a methyl methoxy siloxane resin (for example, commercial product Silres MSE 100) and methyl phenyl vinyl siloxane resin (for example, commercial product Silres H62 C).

Advantageously, the liquid resin can be selected among the liquid siloxane resins with no solvent or with solvent content below 2% by weight.

According to a preferred embodiment of the invention, the solid resin is a phenyl siloxane resin, while the liquid resin is a methyl methoxy siloxane resin.

Advantageously, the aforesaid polymeric binder composition can further comprise at least one solvent, selected among the compounds able to solubilise polysiloxanes and polysilsesquioxanes. The function of the solvent is to maintain over time the rheological characteristics of the resin, thus making the pre-preg manipulable for a longer time, so that the pre-preg can be processed more easily and preserved for longer times.

Preferably, the aforesaid solvent is divinylbenzene, which has the advantage of having low vapor pressure (it tends to evaporate less) and not being flammable, unlike other solvents usable for the purpose, for example toluene or acetone.

Preferably, the solvent (if present) constitutes less than 1% by weight of the pre-impregnated fibre-reinforced composite material. Preferably, the solvent (if present) constitutes no less than 0.2% by weight of the pre-impregnated fibre-reinforced composite material.

Advantageously, the aforesaid polymeric binder composition can comprise at least one catalyst adapted to promote the cross-linking of the polymers (polysiloxanes and/or polysilsesquioxanes) of the polymeric binder composition at temperatures above 100° C.

The presence of the catalyst makes the processes more suitable for industrial production because it reduces the times and temperatures necessary to form the pieces.

In particular, the catalyst can be inserted directly in the polymeric composition or it can be added to the polymeric binder composition during the preparation of the pre-preg, at a temperature lower than 100° C., so that, during these steps, it remains latent and does not initiate the cross-linking reaction of the polymeric binder composition. The catalyst then has to perform its function at the temperature at which the composite would subsequently be formed (for example 150-180° C.)

Preferably, the catalyst is selected from the group consisting of titanates, metal octoates and amines or a combination thereof.

Still more preferably, the catalyst is selected from the group consisting of: titanium tetrabutanolate (for example supplied by Wacker with the commercial name "Catalyst TC 44"); zinc octoate; and N-[3-(Trimethoxysilyl)propyl]ethylenediamine (for example, supplied by Wacker with the commercial name "Geniosil GF 91").

The catalyst (if present) constitutes less than 1% by weight of the polymeric matrix of the pre-impregnated fibre-reinforced composite material.

According to an alternative embodiment of the invention, the aforesaid polymeric binder composition can comprise a mixture of:

a single resin selected from the group consisting of siloxane resins and silsesquioxane resins, liquid at ambient temperature, with viscosity at ambient temperatures of between 1 mPas and 5000 mPas; and an inert filler in powder form, able to provide the polymeric binder composition with the rheological characteristics necessary to allow the impregnation of the fibrous mass.

The term "inert" means a substance that does not participate in the curing reactions.

In particular, the inert filler in powder form is introduced to increase the viscosity of the liquid resin at ambient temperature.

In general, the volume ratio between inert filler in powder form and liquid polymer at ambient temperature is selected so that the polymeric binder composition obtained from their mixture is a liquid with viscosity between 55000 and 10000 mPas at temperatures between 50° C. and 70° C.

Preferably, the volume ratio of inert filler to liquid polymer at room temperature is between 10/100 and 40/100.

Advantageously, the aforesaid polymeric binder composition can consist entirely of the aforesaid mixture of liquid resin at ambient temperature and of inert filler.

Advantageously, the aforesaid polymeric binder composition (even if it is defined by a mixture of multiple resins) can further comprise a thermal insulating inert filler, preferably selected from the group consisting of oxides, silicates, phosphates or a combination thereof.

Preferably, the thermal insulating inert filler consists from 1% to 30% by volume of the pre-impregnated fibre-reinforced composite material.

The introduction of a thermal insulating inert filler in the polymeric binder composition is preferable if the pre-impregnated fibre-reinforced composite material is used to make materials to be used as thermal barriers.

Advantageously, the aforesaid fibrous mass can consist of fibres selected in the group consisting of: carbon fibres; glass fibres; ceramic fibres; or mixtures thereof.

In particular, carbon fibres are carbon fibres from polyacrylonitrile (PAN) and/or carbon fibres from pitch.

In particular, glass or ceramic fibres consist of silica, alumina, zirconia or silicon Carbide.

According to a preferred embodiment, the aforesaid fibrous mass consists only of carbon fibres (PAN or pitch).

Preferably, the fibrous mass consists of continuous fibres that form one or more layers of fabric or of nonwoven fabric.

Alternatively, the fibrous mass can consist of broken fibres dispersed in the matrix formed by the aforesaid polymeric binder composition.

As stated, the content of fibres and of polymeric binder composition can be varied according to the characteristics to be obtained in the final materials to be produced starting from the pre-preg according to the invention. A pre-preg with high fibre content is more indicated for indications for which high mechanical characteristics are required. A higher percentage of resin can instead be more indicated for applications requiring higher operating temperatures, flameproof protection or resistance to mechanical wear.

Some formulations of the pre-impregnated fibre-reinforced composite material according to the invention, without organic resins, are provided in the following tables two tables 1 and 2.

TABLE 1

| Formulation 1 | Pre-preg based on Pitch fibres [wt %] | Pre-preg based on PAN fibres [wt %] |
|---|---|---|
| Solid resin RSN-0217 (Dow Corning) | 20-40 | 20-40 |
| Liquid resin Silres MSE100 (Wacker) | <20 | <20 |
| Divinylbenzene (DVB) | <1 | <1 |
| fibre content | 40-70 | 40-70 |

TABLE 2

| Formulation 2 | Pre-preg based on Pitch fibres [% by weight] | Pre-preg based on PAN fibres [% by weight] |
|---|---|---|
| Solid resin RSN-0217 (Dow Corning) | 20-30 | 25-35 |
| Liquid resin Silres MSE100 (Wacker) | 5-15 | 5-15 |
| Divinylbenzene (DVB) | <1 | <1 |
| fibre content | 55-65 | 50-60 |

Some general formulations of the pre-impregnated fibre-reinforced composite material according to the invention, also comprising at least one organic resin, are provided in Table 3 below.

TABLE 3

| Formulation 3 | Pre-preg based on Pitch fibres [% by weight] | Pre-preg based on PAN fibres [% by weight] |
|---|---|---|
| Solid resin RSN-0217 (Dow Corning) | 20-30 | 25-35 |
| Liquid resin Silres MSE100 (Wacker) | 0-5 | 0-5 |
| Phenolic resin Norsophen 1203 | 5-10 | 5-10 |
| Divinylbenzene (DVB) | <1 | <1 |
| fibre content | 55-65 | 50-60 |

An object of the present invention is also a method for making a pre-impregnated fibre-reinforced composite material (intended to be subjected to subsequent forming and pyrolysis operations to make a fibre-reinforced composite material), in particular according to the present invention and in yet more detail as described above.

According to a general embodiment, said method comprises the following operating steps:
arranging a fibrous mass in laminar form;
arranging a polymeric binder composition;
impregnating said fibrous mass with said polymeric binder composition obtaining a pre-impregnated fibre-reinforced composite material.

According to the invention, the aforesaid polymeric binder composition is based on one or more resins selected from the group consisting of siloxane resins and silsesquioxane resins.

As stated above, the expression "based on . . . " means that the resins selected in the group consisting of siloxane resins and silsesquioxane resins constitute at least 70% by weight of the polymeric binder composition.

Optionally, the aforesaid polymeric binder composition can comprise organic resins, preferably epoxy resins, phenolic resins and/or resins based on vinyl ester or cyanate ester. However, organic resins, if present, do not constitute more than 30% by weight of the polymeric binder composition.

Preferably, the aforesaid polymeric binder composition comprises only resins chosen in the group consisting of siloxane resins and silsesquioxane resins, and does not comprise organic resins.

As stated above, silsesquioxane resins comprise polysiloxanes, while silsesquioxane resins comprise polysilsesquioxanes.

According to the invention, the aforesaid polymeric binder composition is a liquid with viscosity between 55000 and 10000 mPas at temperatures between 50° C. and 70° C.

Following the impregnating step, the polymeric binder composition forms a binder polymeric matrix, not cross-linked or only partially cross-linked, which fills the interstices of the fibrous mass.

What is described above in relation to the pre-impregnated fibre-reinforced composite material according to the invention also applies to the method for making said pre-impregnated material according to the invention. For the sake of brevity, this description is not repeated, however it is understood to be extended to the manufacturing method as well.

An object of the present invention is a fibre-reinforced composite ceramic material obtained by forming and pyrolysis of a pre-impregnated fibre-reinforced composite material (pre-preg) according to the invention, and in particular as described above.

The term "fibre-reinforced composite ceramic material" means, in general, a material having a ceramic or partially ceramic matrix within which are arranged reinforcing fibres.

The term "ceramic matrix" means the matrix obtained from the pyrolysis of the siloxane and/or silsesquioxane resins, which belong to the family of pre-ceramic resins. The partial or complete ceramization of the matrix can be obtained regulating the pyrolysis temperature. Pyrolysis treatments at low temperature (400-900° C.) allow to obtain a partially pyrolyzed pyrolysis residue, still rich in organic structures. Pyrolysis at higher temperatures entail the complete ceramization of the pyrolysis residue, which can form amorphous or crystalline inorganic structures (the latter at pyrolysis temperatures above approximately 1300° C.)

The composition of the ceramic or partially ceramic matrix depends on the type of ceramic precursors used to produce the material.

In the specific case, the ceramic precursors used are polysiloxanes or polysilsesquioxanes, contained in the polymeric binder composition of the pre-impregnated fibre-reinforced composite material (pre-preg) according to the invention, used as a starting base. The ceramic or partially ceramic matrix comprises silicon oxycarbides (SiOC) and/or silicon Carbide (SiC). In particular, silicon oxycarbides (SiOC) can form amorphous structures consisting of Si—O—C chains of different lengths.

According to the invention, the pre-preg from which the fibre-reinforced composite ceramic material is obtained by forming and pyrolysis comprises a fibrous mass impregnated with a polymeric binder composition based on one or more resins selected from the group consisting of siloxane resins and silsesquioxane resins, with characteristics already described above and which, for brevity, will not be set forth again.

In particular, the aforesaid polymeric binder composition can comprise organic resins, preferably epoxy resins, phenolic resins and/or resins based on vinyl ester or cyanate ester, although preferably it comprises only resins selected from the group consisting of siloxane resins and silsesquioxane resins, and does not comprise organic resins.

The fibre-reinforced composite ceramic material according to the invention comprises a ceramic or partially ceramic matrix that develops itself in the interstices of the aforesaid fibrous mass and that comprises silicon Carbide and amorphous structures consisting of chains of Si—O—C. The silicon Carbide and the chains of Si—O—C were generated by the pyrolysis process on said polysiloxanes and/or said polysilsesquioxanes.

The composite ceramic material fibre-reinforced and pyrolyzed according to the invention has a porosity generated by pyrolysis on the polymeric binder composition of the pre-preg. This porosity can be regulated by many variables, including types and contents of resins used to obtain the pre-preg, forming technique and parameters, pyrolysis temperature. Typically, composites are obtained that after pyrolysis have porosity between 20 and 40%. Hereinafter, for simplicity, the expression "ceramic matrix" will be used instead of the expression "ceramic or partially ceramic matrix".

The pre-preg utilised according to the invention is then differentiated from a traditional pre-preg, by not being impregnated or at least not being exclusively impregnated with organic resins (in particular, phenolic or epoxy resins, or resins based on vinyl ester or cyanate ester), but being impregnated with a polymeric binder composition based on one or more resins selected from the group consisting of siloxane resins and silsesquioxane resins.

Siloxane and silsesquioxane resins have different characteristics from the organic (mainly epoxydic) resins normally used for manufacturing pre-pregs, in particular pre-pregs based on carbon fibres or glass fibres or ceramic fibres.

In the first place, siloxane and silsesquioxane resins exhibit a far greater temperature stability, thanks to their lower weight loss, both in oxidising atmosphere and in inert atmosphere.

A second peculiar characteristic of siloxane resins and silsesquioxane resins is the ability to form, as a result of pyrolysis at temperatures between 400 and 900° C., amorphous structures consisting of Si—O—C chains. These structures can be crystallised by heat treatments at higher temperatures, around 1300-1500° C. In this way it is possible to form, starting from resins selected from the group consisting of siloxane resins and silsesquioxane resins, silicon Carbide, a compound with properties of technological interest, such as: very high hardness, high elastic modulus, high melting point and thermal stability, high thermal conductivity.

Instead, organic resins form, as a result of pyrolysis, a carbonaceous residue, which in the case of epoxy resins is also very limited and insufficient to assure a good consistency of the composites. Said carbonaceous residue, moreover, is not suitable for applications with high temperatures in oxidising environment and does not have sufficient hardness to assure good abrasion resistance.

For this reason, as stated above, according to the invention, the polymeric binder composition preferably does not contain organic resins. In any case, the content of organic resins is no higher than 30% by weight of the polymeric binder composition, so as to limit the negative effect given by the presence of the organic resins.

Siloxane or silsesquioxane resins, given the reduced weight loss after pyrolysis and the possibility of forming silicon Carbide, are indicated to make preforms to be densified. The term "densification" means processes such as: polymer impregnation and pyrolysis (PIP) or liquid silicon infiltration (LSI).

As will be described in more detail below, the characteristics of the fibre-reinforced composite ceramic material obtained from a pre-preg according to the invention after forming and pyrolysis and optionally densification are:
  medium mechanical characteristics (ultimate tensile stress up to approximately 300-350 MPa, a value that is influenced by many factors, including fibres and types and levels of densification);
  Thermal conductivity ($>1$ W/(m·° K));
  Good resistance to abrasion wear;
  Operating temperature up to 1000° C., in any case variable according to the densification processes.

Applications for which composites obtained in this way can be of interest are in particular structure components intended to operate at high temperatures, even above 400° C.

The above advantages are evident if the preform is subjected to densification process with PIP techniques. The use of resins containing silicon is the only way to generate silicon Carbide in matrix directly in the preform. This could in no way be obtained if the preform were produced from pre-preg based exclusively on organic resins. This aspect allows to realise, with PIP techniques, composites with a significantly higher content of silicon Carbide in matrix than the composites obtained applying the same techniques to carbonaceous preforms obtained exclusively from organic resins.

These advantages instead are less evident in the case of densification with LSI technique. It should be recalled that infiltration with silicon allows to form a high quantity of silicon Carbide in matrix even starting from a pre-preg with organic base (for example a phenolic pre-preg).

According to a preferred embodiment, the ceramic matrix constitutes from 15% to 70% by weight of the fibre-reinforced composite ceramic material, while the fibrous mass constitutes from 30% to 85% by weight of that material.

The content of fibres and of ceramic matrix can be varied according to the characteristics to be obtained in the fibre-reinforced composite material according to the invention.

A material with high fibre content is more indicated for applications for which high mechanical characteristics are required. A higher percentage of ceramic matrix can instead be more indicated for applications requiring higher operating temperatures or resistance to mechanical wear.

In particular, the fibrous mass can consist of fibres selected from the group consisting of carbon fibres, glass fibres, ceramic fibres or mixtures thereof. In particular, carbon fibres are carbon fibres from polyacrylonitrile (PAN) and/or carbon fibres from pitch, while glass or ceramic fibres consist of alumina, zirconia or silicon Carbide.

According to a preferred embodiment, the fibrous mass consists only of carbon fibres, PAN or pitch.

Preferably, the fibrous mass consists of continuous fibres that form one or more layers of fabric or of nonwoven fabric.

Alternatively, the fibrous mass can consist of chop fibres dispersed in the matrix formed by the aforesaid polymeric binder composition.

Advantageously, the aforesaid ceramic matrix can comprise a thermal insulating inert filler in powder form.

Preferably, the inert thermal insulating filler in the form of powder is selected from the group consisting of oxides, silicates and phosphates or a combination thereof.

Advantageously, the thermal insulating inert filler can be in aerogel form.

The presence of this filler is functional to reduce the thermal conductivity of the material, increasing its thermal insulating properties.

The presence of a thermal insulating filler in the fibre-reinforced composite material is to be preferred if the manufactured article is a thermal or flameproof barrier or a component with structural function that has to operate at high temperatures.

An aspect that influences the characteristics of the fibre-reinforced composite ceramic material according to the invention is the technique for forming the pre-preg, because it influences the final density of the composite thus obtained and hence the mechanical resistance characteristics.

Two forming techniques were evaluated:
Compression moulding:
Vacuum Bagging followed by curing in autoclave.

The different forming techniques typically work at different pressures. A greater pressure allows to obtain greater density of the "as cured" composite material (i.e. at the end of the forming operation, before pyrolysis) and hence superior mechanical characteristics.

In the case of compression moulding, pressures from 20 to approximately 80-100 bar; in the case of vacuum bagging (followed by curing in autoclave), pressures of the order of 2-14 bar can be applied.

In case of forming by compression moulding, it has been observed that the density of the composite after forming (but before pyrolysis) increases as the moulding pressure increases. The graph of FIG. 1 shows the density of the fibre-reinforced composite material as a function of moulding pressure, if the material was obtained from a pre-preg based on PAN fibres (with characteristics indicated in Table 2 above) with forming by compression moulding. Above approximately 50 bar, the maximum densification of the composite, and hence the optimal mechanical characteristics, are obtained.

It can be affirmed that compression moulding is indicated for:
forming composites with superior mechanical characteristics;
making pieces with planar and simple shape;
more rapid process times.

Vacuum bagging instead is more indicated for forming pieces with complex shapes and when high moulding densities are not required. In particular, if the pre-preg is used to manufacture preforms to be densified, perfect compacting of the pre-preg in the moulding phase is not necessary. A determined degree of porosity could be sought with the purpose of avoiding the emergence of delaminations or bulges during the subsequent pyrolysis. These porosities can then be closed during the subsequent densification processes (PIP or LSI).

Preferably, the fibre-reinforced composite ceramic material according to the invention is obtained subjecting the pre-preg to forming by vacuum bagging technique and subsequent curing heat treatment.

Preferably, the vacuum bagging process is carried out at a pressure of between 2 and 14 bar and at a temperature between 150° C. and 300° C. for a time of 1 to 6 hours, which may be followed by a post-curing cycle at a temperature between 250° C. and 300° C. for a time of 1 to 3 hours.

Alternatively, the fibre-reinforced composite ceramic material according to the invention is obtained subjecting the pre-preg to hot forming by compression moulding technique.

Preferably, hot forming by compression moulding is carried out with a pressure of no less than 40 bar and at a temperature of no less than 200° C. for a time between 60 and 150 minutes.

It is possible to carry out the forming operation at temperatures below 200° C., preferably around 180° C., providing a subsequent post-curing treatment. However, it has been observed experimentally that the best characteristics are obtained with forming at 300° C.

The vacuum bagging technique and the compression moulding technique are both well known to the person skilled in the art and will not be described in detail herein.

An object of the present invention is a manufactured article fully or partly obtained with a fibre-reinforced composite ceramic material according to the present invention, in particular as described above.

Preferably, the aforesaid manufactured article is a preform to be subjected to densification processes, preferably with Polymer Infiltration Pyrolysis (PIP) technique, to obtain a heat barrier or a structural component intended to operate at high temperatures.

An object of the present invention is also a method for producing the fibre-reinforced composite ceramic material according to the present invention and in particular as described above.

According to a general embodiment, said method comprises the following operating steps:
arranging a pre-impregnated fibre-reinforced composite material (pre-preg) impregnated with a polymeric binder composition according to the invention, and in particular as described above; and
forming pre-impregnated fibre-reinforced composite ceramic material (pre-preg) bringing said polymeric binder composition at least to a partial curing obtaining a fibre-reinforced composite ceramic material;

subjecting the aforesaid fibre-reinforced composite material to pyrolysis at a temperature between 400° C. and 1,500° C.

According to the invention, forming leads to curing said one or more resins of the polymeric binder composition of the pre-preg and hence to the formation of a solid polymeric binding matrix that develops itself in the interstices of the fibrous mass of the pre-preg and it is based on polysiloxanes and/or polysilsesquioxanes, mutually cross-linking as a result of the cross-linking induced by the curing of the aforesaid one or more resins of the polymeric binder composition of the pre-preg.

Preferably, forming is carried out by vacuum bagging and subsequent curing thermal treatment.

Preferably, the vacuum bagging process is carried out at a pressure of between 2 and 14 bar and at a temperature between 150° C. and 300° C. for a time of 1 to 6 hours, which may be followed by a post-curing cycle at a temperature between 250° C. and 300° C. for a time of 1 to 3 hours.

Alternatively, hot forming is achieved by compression moulding.

Preferably, hot forming by compression moulding is carried out with a pressure of no less than 40 bar and at a temperature of no less than 200° C. for a time between 60 and 150 minutes.

It is possible to carry out the forming operation at temperatures below 200° C., preferably around 180° C., providing a subsequent post-curing treatment. However, it has been observed experimentally that the best characteristics are obtained with forming at 300° C.

According to the invention, pyrolysis causes the formation of porosities in the solid binder polymeric matrix because of a partial degradation of the solid binder polymeric matrix and the at least partial transformation of said polysiloxanes and/or of said polysilsesquioxanes into silicon Carbide and into amorphous structures consisting of Si—O—C chains, so as to obtain a fibre-reinforced composite ceramic material from said fibre-reinforced composite material.

The pyrolysis treatment can be carried out in inert atmosphere, for example in nitrogen or in argon, or in a vacuum. Typically, treatments are executed with up ramps between 0.2 and 1° C./min. Pyrolysis temperatures are usually between 400 and 1500° C.

Advantageously, the method can comprise a step of densifying the fibre-reinforced composite ceramic material. Said densifying step is conducted after the pyrolysis step.

Preferably, the densifying step is conducted with Polymer Infiltration Pyrolysis (PIP) technique.

Alternatively, the densifying step can be conducted by liquid silicon infiltration (LSI).

Preferably, the polymeric binder composition constitutes from 25% to 60% by weight of the pre-preg, while the fibrous mass constitutes from 40% to 75% by weight of the pre-preg.

The polymeric binder composition to be used in the present invention and the method for producing the pre-impregnated fibre-reinforced composite material (pre-preg) according to the invention have already been described above in relation to the fibre-reinforced composite ceramic material according to the invention. For simplicity of description, these characteristics are not repeated again, but they are understood also to be referred to the method for producing the ceramic composite material according to the invention.

Application Examples

As stated, the pre-impregnated fibre-reinforced composite material according to the present invention finds particular application as a basic material for the production (through subsequent treatments and processing) of components intended to operate at high temperatures (even higher than 400° C.), for example heat-resistant bulkheads or other components intended to operate at high temperatures.

It was possible to verify experimentally that the pre-impregnated fibre-reinforced composite material according to the invention, lacking organic resins or, at least, not impregnated exclusively with organic resins, such as epoxy or phenolic resins, can lead, following pyrolysis at temperatures between 400° C. and 1500° C., to the formation of such amorphous and/or crystalline inorganic structures as to make the composite materials thus obtained adequate for the production of preforms for densification processes and characterised by greater hardness, so as to assure superior abrasion resistance and high thermal conductivity.

In particular, it has been verified experimentally that the fibre-reinforced composite ceramic material according to the invention, obtained by forming and pyrolysis of a pre-preg that does not contain or, at least, does not exclusively contain organic resins, and impregnated with a polymeric binder composition based on one or more siloxane resins and/or silsesquioxane resins, has such silicon Carbine and amorphous inorganic structures consisting of chains of Si—O—C, as to make it adequate to the production of preforms for densification processes, and it is characterised by high thermal conductivity and by greater hardness, so as to assure a superior resistance and abrasion.

Fibre-reinforced composite materials according to the present invention were tested, starting from pre-pregs impregnated with two different formulations of the polymeric binder composition, lacking organic resins. The two formulations differ essentially in that a formulation is made with carbon fibres from pitch and the other formulation is made with carbon fibres from polyacrylonitrile (PAN).

In both formulations, the same resins were used, changing the weight ratios to maintain constant the ratios by volume between resins and fibres. This became necessary because the different types of fibres have different densities.

The two formulations correspond to the two formulations indicated in table 2 above.

As polymeric binder composition, a mixture of two siloxane resins was used, of which one that is solid at ambient temperature and one that is liquid at ambient temperature. The weight ratio between solid resin and liquid resin is between 100/30 and 100/50.

The solid resin used was the resin RSN-0217 (marketed by Dow Corning); it is a phenyl siloxane resin, solid at ambient temperature, with melting point of approximately 80° C.

The liquid resin used was the resin Silres MSE100 (marketed by Wacker); it is a methyl methoxy siloxane resin, liquid at ambient temperature, characterised by low viscosity, around 25-40 mPas at ambient temperature.

The solid resin is soluble in the liquid resin and a solution with weight ratios between 100/30 and 100/50 respectively between solid and liquid has optimal properties for the production of a pre-preg. In particular, the mixture has a semi-solid and sticky appearance at ambient temperature, whereas at 50-70° C. it is a highly viscous liquid (between 55000 and 10000 mPas), ideal characteristic to impregnate a fabric.

Carbon fibres were used in the form of a unidirectional laminate, i.e. consisting of fibres oriented along only one direction.

The laminate of fibres (Pitch or PAN fibres) was impregnated with the polymeric binder composition at a temperature between 70 and 75° C. obtaining the pre-preg.

The impregnated laminate (pre-preg) thus obtained was then subjected to forming, inducing the curing (cross-linking) of the resins, obtaining a fibre-reinforced composite material.

In particular, hot forming was carried out by compression moulding. Tests were conducted at two different pressures: 51 bar and 26 bar. Forming was conducted at 300° C. for a minimum time of 150 minutes, without conducting a post-curing step.

The samples of fibre-reinforced composite material according to the invention obtained from the formulation with fibre pitch (in the form of unidirectional laminate), after forming (with compression moulding at 50 bar) and complete cross-linking of the resins, were subjected to pyrolysis and densification by Polymer Infiltration Pyrolysis process (PIP; 3 cycles).

The pyrolysis treatments were conducted at 1500° C. in vacuum. Densification was carried out with a liquid siloxane resin. The impregnation process was carried out at ambient temperature, at a vacuum level of approximately 40 mbar.

The samples were characterized in terms of thermal conductivity and mechanical resistance.

Table 4 shows the values of thermal conductivity of a sample of fibre-reinforced composite ceramic material, after pyrolysis and densification by PIP process (3 cycles). The characterization was carried out with Laserflash technique, in accordance with ASTM E-1461, in an orthogonal direction to the planes of the pre-preg and at 400° C. in nitrogen.

TABLE 4

| Preform | Composite density [g/cm3] | Specific heat [J/(g · K)] Mean | Thermal diffusivity [mm2/s] Mean | Thermal diffusivity [mm2/s] St. Dev. | Thermal conductivity [W/(m · ° K)] Mean | Thermal conductivity [W/(m · ° K)] St. Dev. |
|---|---|---|---|---|---|---|
| laminate UD pitch | 1.83 | 1.68 | 1.38 | 0.01 | 4.25 | 0.02 |

The level of conductivity of the composite, higher than 4 W/(m·° K), derives from the conductivity of the matrix, which was partly crystallized to silicon Carbide.

Table 5 shows the values of some mechanical resistance properties of the same composite that was thermally characterized. The characterisation was conducted with 3-point flexural test in accordance with the ASTM C-1341 standard, testing the composite with fibre orientation at 0°. The measurement was conducted on only one specimen.

TABLE 5

| Preform | MOR [MPa] Mean | MOR [MPa] St. Dev. | MOE [GPa] Mean | MOE [GPa] St. Dev. | Deformation at break [%] Mean | Deformation at break [%] St. Dev. |
|---|---|---|---|---|---|---|
| UD pitch | 342 | — | 175 | — | 0.21 | — |

The test confirmed that the fibre-reinforced composite ceramic material according to the present invention—after forming and subsequent pyrolysis and densification can lead to the production of components intended to operate a high temperatures (even higher than 400° C.), for example thermal barriers, flameproof barriers or structural components.

As a result of the fact that the polymeric binder composition is based on siloxane resins and/or silsesquioxane resins, following pyrolysis between 400 and 1500° C., the composite material has silicon Carbide and amorphous structures consisting of Si—O—C chains, which assure operating temperatures up to 1000° C. (variable according to the densification processes). The formation at least in part of silicon Carbide as a result of pyrolysis treatments at temperatures up to 1500° C., provides the composite with properties of technological interest, such as: high hardness, high elastic modulus, high thermal stability, high thermal conductivity.

In particular, it is worth stressing the high thermal conductivity, well above 1 W/(m·° K).

Mechanical resistance values are medium. In particular, it is worth stressing the flexural strength (MOR), which reaches values of approximately 300-350 MPa (this value is affected by many factors, including fibres and types and levels of densification).

Lastly, the presence of silicon Carbide in the matrix assures good resistance to abrasion wear.

The invention thus conceived therefore achieves the preset purposes.

Obviously, in its practical embodiment the invention may also assume different shapes and configurations from the one illustrated above, without thereby departing from the present scope of protection.

In addition, all details may be replaced by technically equivalent elements and the dimensions, the shapes and the materials used may be any, according to the needs.

The invention claimed is:

1. Pre-impregnated fibre-reinforced composite material in laminar form, obtained by impregnating a fibrous mass with a polymeric binder composition and destined to be subjected to subsequent forming and pyrolysis operations to obtain a fibre-reinforced composite ceramic material,
  wherein said polymeric binder composition comprises a mixture of:
    at least one solid resin selected from the group consisting of siloxane resins and silsesquioxane resins, solid at room temperature, with melting point range of between 40° C. and 90° C.; and
    at least one liquid resin selected from the group consisting of siloxane resins and silsesquioxane resins, liquid at room temperature, with viscosity at room temperature of between 1 mPas and 5000 mPas,
  wherein the weight ratio between solid resin at room temperature and liquid resin at room temperature is between 100/30 and 100/50,
  wherein said solid resin at room temperature is selected from the group consisting of a phenyl siloxane, methyl siloxane, methyl methoxy silsesquioxane, and methyl silsesquioxane resin, and wherein said liquid resin at room temperature is selected from the group consisting of a methyl methoxy siloxane and methyl phenyl vinyl siloxane resin,
  wherein said polymeric binder composition is a liquid having viscosity of between 55000 and 10000 mPas at temperatures of between 50° C. and 70° C., and
  wherein the polymeric binder composition forms a polymeric binding matrix not crosslinked or only partially crosslinked which fills the interstices of the fibrous mass.

2. Material according to claim 1, wherein said polymeric binder composition comprises only resins chosen in the group consisting of siloxane resins and silsesquioxane resins, and does not comprise organic resins.

3. Pre-impregnated fibre-reinforced composite material according to claim 1, wherein said polymeric binder composition constitutes from 25% to 60% by weight of said pre-impregnated fibre-reinforced composite material and wherein said fibrous mass constitutes from 40% to 75% by weight of said pre-impregnated fibre-reinforced composite material.

4. Pre-impregnated fibre-reinforced composite material according to claim 1, wherein said polymeric binder composition comprises a mixture of:
- a single resin selected from the group consisting of siloxane resins and silsesquioxane resins, liquid at room temperature, with viscosity at room temperature of between 1 mPas and 5000 mPas and
- an inert filler in powder form,
- the volume ratio of inert filler to liquid polymer at room temperature is between 10/100 and 40/100.

5. Pre-impregnated fibre-reinforced composite material according to claim 1, wherein said polymeric binder composition further comprises at least one solvent, selected from the compounds able to solubilize polysiloxanes and polysilsesquioxanes.

6. Pre-impregnated fibre-reinforced composite material according to claim 1, wherein said polymeric binder composition further comprises at least one catalyst adapted to promote the cross-linking of said polymeric composition at temperatures higher than 100° C.

7. Pre-impregnated fibre-reinforced composite material according to claim 1, wherein said polymeric binder composition further comprises a thermo-insulating inert filler.

8. Pre-impregnated fibre-reinforced composite material according to claim 1, wherein said fibrous mass consists of fibres selected from the group consisting of carbon fibres, glass fibres, ceramic fibres and mixtures thereof.

9. Pre-impregnated fibre-reinforced composite material according to claim 1, wherein said fibrous mass consists of continuous fibres forming one or more layers of fabric or nonwoven fabric.

10. Pre-impregnated fibre-reinforced composite material according to claim 1, wherein said fibrous mass consists of chopped fibres dispersed in the matrix formed by said polymeric binder composition.

11. Pre-impregnated fibre-reinforced composite material according to claim 5, wherein said solvent is divinylbenzene.

12. Pre-impregnated fibre-reinforced composite material according to claim 6, wherein said catalyst is selected from the group consisting of titanates, metal octoates and amines.

13. Pre-impregnated fibre-reinforced composite material according to claim 6, wherein said catalyst is selected from the group consisting of titanium tetrabutanolate, zinc octoate and N-3-(trimethoxysilyl)propyl)ethylenediamine.

14. Pre-impregnated fibre-reinforced composite material according to claim 6, wherein said catalyst constitutes less than 1% by weight of the polymeric matrix of said pre-impregnated fibre-reinforced composite material.

15. Pre-impregnated fibre-reinforced composite material according to claim 7, wherein said thermo-insulating inert filler is selected from the group consisting of oxides, silicates, phosphates, and a combination thereof.

16. Pre-impregnated fibre-reinforced composite material according to claim 7, wherein said thermo-insulating inert filler constitutes from 1% to 30% by volume of said pre-impregnated fibre-reinforced composite material.

17. Pre-impregnated fibre-reinforced composite material according to claim 8, wherein the carbon fibres are carbon fibres from polyacrylonitrile (PAN) and/or carbon fibres from pitch, and the glass or ceramic fibres consist of silica, alumina, zirconia, or silicon carbide.

18. Method for making a pre-impregnated fibre-reinforced composite material destined to be subjected to subsequent forming and complete curing operations to make a fibre-reinforced composite material, comprising the following operating steps:
- arranging a fibrous mass in laminar form;
- arranging a polymeric binder composition;
- impregnating said fibrous mass with said polymeric binder composition obtaining a pre-impregnated fibre-reinforced composite material,
- wherein said polymeric binder composition comprises a mixture of:
- at least one solid resin selected from the group consisting of siloxane resins and silsesquioxane resins, solid at room temperature, with melting point range of between 40° C. and 90° C.; and
- at least one liquid resin selected from the group consisting of siloxane resins and silsesquioxane resins, liquid at room temperature, with viscosity at room temperature of between 1 mPas and 5000 mPas,
- wherein the weight ratio between solid resin at room temperature and liquid resin at room temperature is between 100/30 and 100/50,
- wherein said solid resin at room temperature is selected from the group consisting of a phenyl siloxane, methyl siloxane, methyl methoxy silsesquioxane, and methyl silsesquioxane resin, and wherein said liquid resin at room temperature is selected from the group consisting of a methyl methoxy siloxane and methyl phenyl vinyl siloxane resin,
- wherein said polymeric binder composition is a liquid having viscosity of between 55000 and 10000 mPas at temperatures of between 50° C. and 70° C., and
- wherein following the impregnation step the polymeric binder composition forms a polymeric binding matrix not crosslinked or only partially crosslinked which fills the interstices of the fibrous mass.

19. Method for producing a fibre-reinforced composite ceramic material, comprising the following operating steps:
- arranging a fibre-reinforced composite ceramic material pre-impregnated with a polymeric binder composition according to claim 1; and
- forming said pre-impregnated fibre-reinforced composite ceramic material bringing said polymeric binder composition at least to a partial curing obtaining a fibre-reinforced composite material;
- subjecting said fibre-reinforced composite material to pyrolysis at a temperature between 400° C. and 1,500° C.,
- wherein said forming leads to the curing of said one or more resins of the polymeric binder composition of said pre-impregnated fibre-reinforced composite ceramic material and hence to the formation of a solid polymeric binding matrix that develops itself in the interstices of the fibrous mass of said pre-impregnated fibre-reinforced composite ceramic material and is based on polysiloxanes and/or polysilsesquioxanes, mutually cross-linked as a result of the cross-linking induced by the curing of said one or more resins of the polymeric binder composition, and wherein said pyrolysis causes the formation of porosities in said solid polymeric binding matrix because of a partial degradation of the solid polymeric binding matrix and the at least partial transformation of said polysiloxanes and/or of said polysilsesquioxanes into silicon Carbide and into amorphous structures consisting of Si—O—C chains, so as to obtain a fibre-reinforced composite ceramic material from said fibre-reinforced composite material.

20. Method according to claim 19, wherein said forming is carried out by vacuum bagging and subsequent heat treatment of curing.

21. Method according to claim 19, wherein said forming is carried under heat out by compression moulding technique.

22. Method according to claim 19, comprising a step of densifying said fibre-reinforced composite ceramic material, conducted after said pyrolysis step, said densifying.

23. Method according to claim 20, wherein said vacuum bagging is carried out at a pressure between 2 and 14 bar and a temperature of between 180° C. and 300° C. for a time between 60 and 150 minutes.

24. Method according to claim 21, wherein said forming is carried out at a pressure not lower than 40 bar and at a temperature not lower than 200° C. for a time between 60 and 150 minutes.

25. Method according to claim 22, wherein said densifying step is conducted with the Polymer Infiltration Pyrolysis (PIP) technique.

* * * * *